US012770363B2

(12) United States Patent
Lovmand et al.

(10) Patent No.: US 12,770,363 B2
(45) Date of Patent: Oct. 20, 2026

(54) QUANTITATIVE IMAGE ANALYSIS

(71) Applicant: DETECTSYSTEM LAB A/S, Vejle Øst (DK)

(72) Inventors: Jan Lovmand, Hedensted (DK); Lars Torp, Fredensborg (DK); Rasmus Bækgård Holm, Vejle (DK)

(73) Assignee: DETECTSYSTEM LAB A/S, Vejle Øst (DK)

( * ) Notice: Subject to any disclaimer, the term of this patent is extended or adjusted under 35 U.S.C. 154(b) by 449 days.

(21) Appl. No.: 18/549,173

(22) PCT Filed: Mar. 9, 2022

(86) PCT No.: PCT/EP2022/055984
§ 371 (c)(1),
(2) Date: Oct. 3, 2023

(87) PCT Pub. No.: WO2022/189482
PCT Pub. Date: Sep. 15, 2022

(65) Prior Publication Data

US 2024/0087285 A1 Mar. 14, 2024

Related U.S. Application Data

(60) Provisional application No. 63/200,489, filed on Mar. 10, 2021.

(51) Int. Cl.
*G06V 10/74* (2022.01)
*G06Q 40/08* (2012.01)
(Continued)

(52) U.S. Cl.
CPC ........... *G06V 10/761* (2022.01); *G06Q 40/08* (2013.01); *G06T 3/40* (2013.01); *G06T 3/60* (2013.01);
(Continued)

(58) Field of Classification Search
CPC .... G06V 10/761; G06V 10/751; G06V 20/95; G06V 10/443; G06V 10/44; G06V 10/40;
(Continued)

(56) References Cited

U.S. PATENT DOCUMENTS 5,193,012 A * 3/1993 Schmidt ............ H04N 1/00291 347/254
8,175,387 B1 5/2012 Hsieh et al.
(Continued)

FOREIGN PATENT DOCUMENTS

| | | | | |
|---|---|---|---|---|
| GB | 2588251 A | 4/2021 | | |
| GB | 2608583 A | 1/2023 | | |
| WO | WO-2020052523 A1 * | 3/2020 | .............. | G06T 7/11 |

OTHER PUBLICATIONS

Sharine Helen et al. “Automated Plagiarism Detection in Handwritten Documents Using Various Computer Vision Algorithms”, Apr. 9, 2025, IEEE (Year: 2025).*
(Continued)

*Primary Examiner* — Aaron W Carter
*Assistant Examiner* — Alejandro Hernandez
(74) *Attorney, Agent, or Firm* — Luedeka Neely, P.C.; Mark P. Crockett

(57) ABSTRACT

The present invention provides a method for quantitatively rating the degree of similarity of images by using orientation, resizing of the digital image, pixilation of the digital image, creation of an image string suitable for generating a hit-score. In the generation of the image string color codes e.g. by the RGB system is used. The hit-score can be a percentage identity or homology between the image strings of the two digital images, said hit-score being the rating of the similarity between the two digital images. The invention also related to the use of the method in process of assessing insurance claims. Further the invention to the use of said
(Continued)

method and for a computer program with instruction for carrying out the method.

14 Claims, 9 Drawing Sheets

(51) Int. Cl.

| | |
|---|---|
| ***G06T 3/40*** | (2024.01) |
| ***G06T 3/60*** | (2024.01) |
| ***G06T 7/11*** | (2017.01) |
| ***G06T 7/90*** | (2017.01) |
| ***G06V 10/75*** | (2022.01) |
| ***G06V 20/00*** | (2022.01) |

(52) U.S. Cl.
CPC .................. *G06T 7/11* (2017.01); *G06T 7/90* (2017.01); *G06V 10/751* (2022.01); *G06V 20/95* (2022.01); *G06T 2207/10024* (2013.01); *G06T 2207/20021* (2013.01); *G06T 2207/30176* (2013.01)

(58) Field of Classification Search
CPC ...... G06V 30/10; G06V 30/12; G06V 30/412; G06V 30/148; G06T 7/11; G06T 7/90; G06T 3/40; G06T 3/60; G06T 2207/10024; G06T 2207/20021; G06T 2207/30176; G06T 11/001; G06T 7/0002; G06Q 40/08; G06F 16/583; G06F 16/58; G06F 16/50; G06K 9/62
See application file for complete search history.

(56) References Cited

U.S. PATENT DOCUMENTS

| | | | | |
|---|---|---|---|---|
| 9,007,647 | B2 * | 4/2015 | Deng | G06F 16/5854 382/199 |
| 10,558,887 | B2 * | 2/2020 | Sodhani | G06F 16/5838 |
| 10,706,516 | B2 * | 7/2020 | Schulte | G06V 10/507 |
| 10,904,286 | B1 * | 1/2021 | Liu | H04L 9/3236 |
| 11,587,234 | B2 * | 2/2023 | Zhao | G06T 7/11 |
| 11,734,560 | B2 * | 8/2023 | Strong | G06N 3/08 382/157 |
| 2008/0252938 | A1 * | 10/2008 | Cazier | H04N 1/387 358/450 |
| 2009/0060346 | A1 * | 3/2009 | Guerzhoy | G06T 7/44 382/197 |
| 2010/0208988 | A1 | 8/2010 | Zhou | |
| 2011/0064329 | A1 * | 3/2011 | Steinberg | G06V 10/242 348/222.1 |
| 2011/0129126 | A1 * | 6/2011 | Begeja | G06F 16/784 382/118 |
| 2015/0339526 | A1 * | 11/2015 | Macciola | G06V 30/40 382/195 |
| 2016/0078630 | A1 * | 3/2016 | Steinberg | G06V 10/56 382/173 |
| 2017/0277971 | A1 * | 9/2017 | Mikuriya | G06T 7/11 |
| 2018/0082410 | A1 * | 3/2018 | Schulte | G06F 18/22 |
| 2018/0182039 | A1 * | 6/2018 | Wang | G06V 20/10 |
| 2019/0087687 | A1 * | 3/2019 | Danielsson | G06F 16/56 |
| 2021/0027497 | A1 * | 1/2021 | Ding | G06V 20/20 |
| 2021/0256333 | A1 * | 8/2021 | Kimura | G06K 15/1822 |
| 2021/0398282 | A1 * | 12/2021 | Frank | G06T 7/0012 |
| 2022/0237799 | A1 * | 7/2022 | Price | G06T 7/174 |
| 2024/0087365 | A1 * | 3/2024 | Pylvaenaeinen | G06V 10/762 |
| 2024/0153240 | A1 * | 5/2024 | Shangguan | G06F 16/73 |
| 2024/0233432 | A1 * | 7/2024 | Li | G06V 10/56 |
| 2026/0038235 | A1 * | 2/2026 | Jenni | G06V 10/761 |

OTHER PUBLICATIONS

European Patent Office, Communication Under Rule 71(3) EPC for EP Application 22713883.1, Dated Oct. 14, 2025.
Anonymous: "Web Colors", Wikipedia, Mar. 3, 2021, pp. 1-7, XP055960173.
Krishnaveni B et al: "Approximation algorithm based on greedy approach for face recognition with partial occlusion" Multimedia Tools and Applications, Kluwer Academic Publishers, Boston US, vol. 78, No. 19, Jun. 22, 2019.
Patent Cooperation Treaty, International Searching Authority—European Patent Office, Form PCT/ISA220, International Search Report and Written Opinion for International Application No. PCT/EP2022/055984, Filing Date: Mar. 9, 2022.

* cited by examiner

Figure 1
| Illustration | Description |
|---|---|
| A | Original image |
| B | Rotated image |
| C | Resized image |
| D | Skewed image |
| E | Cropped image |
| F | Mirrored image |
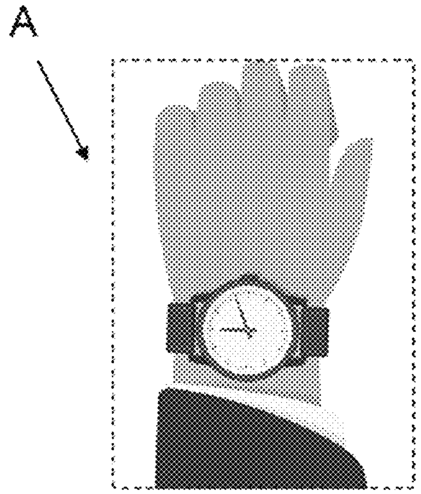
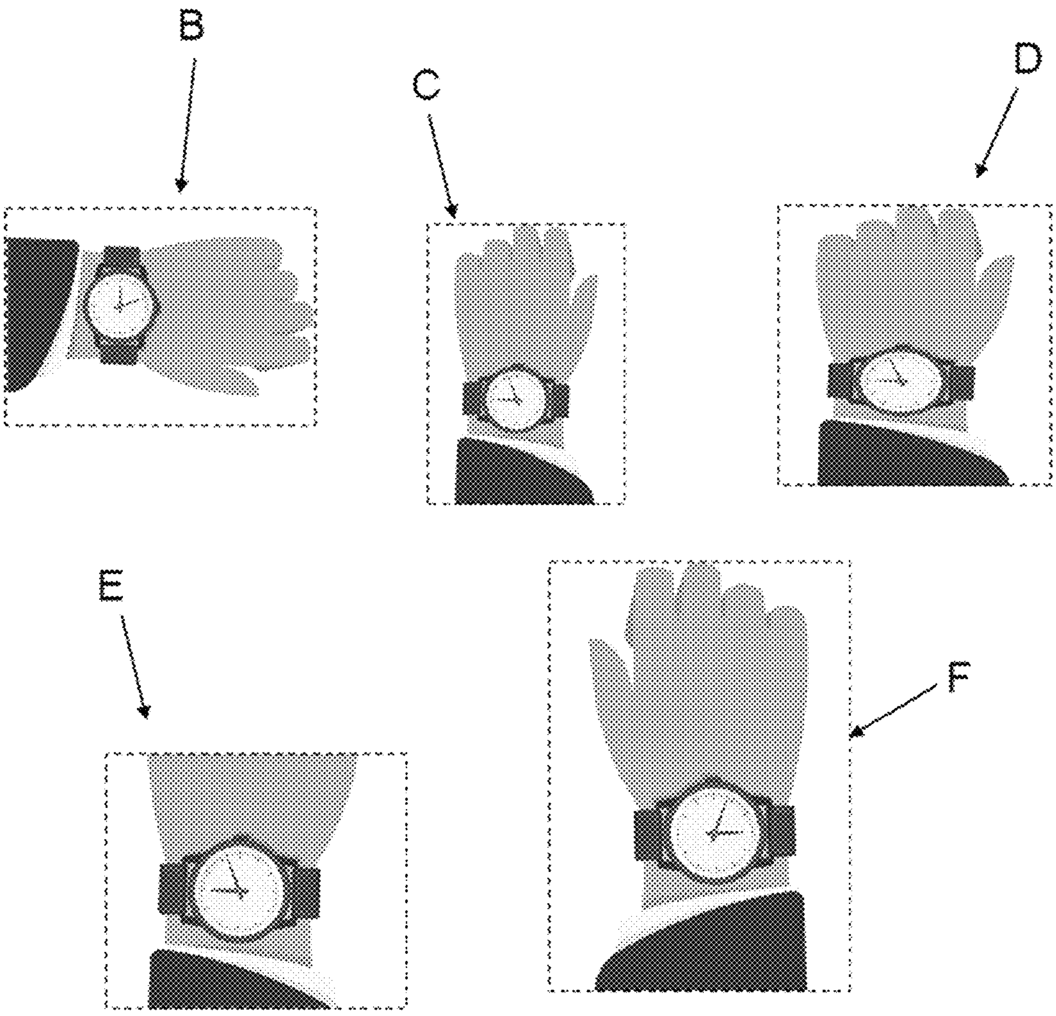

Figure 7

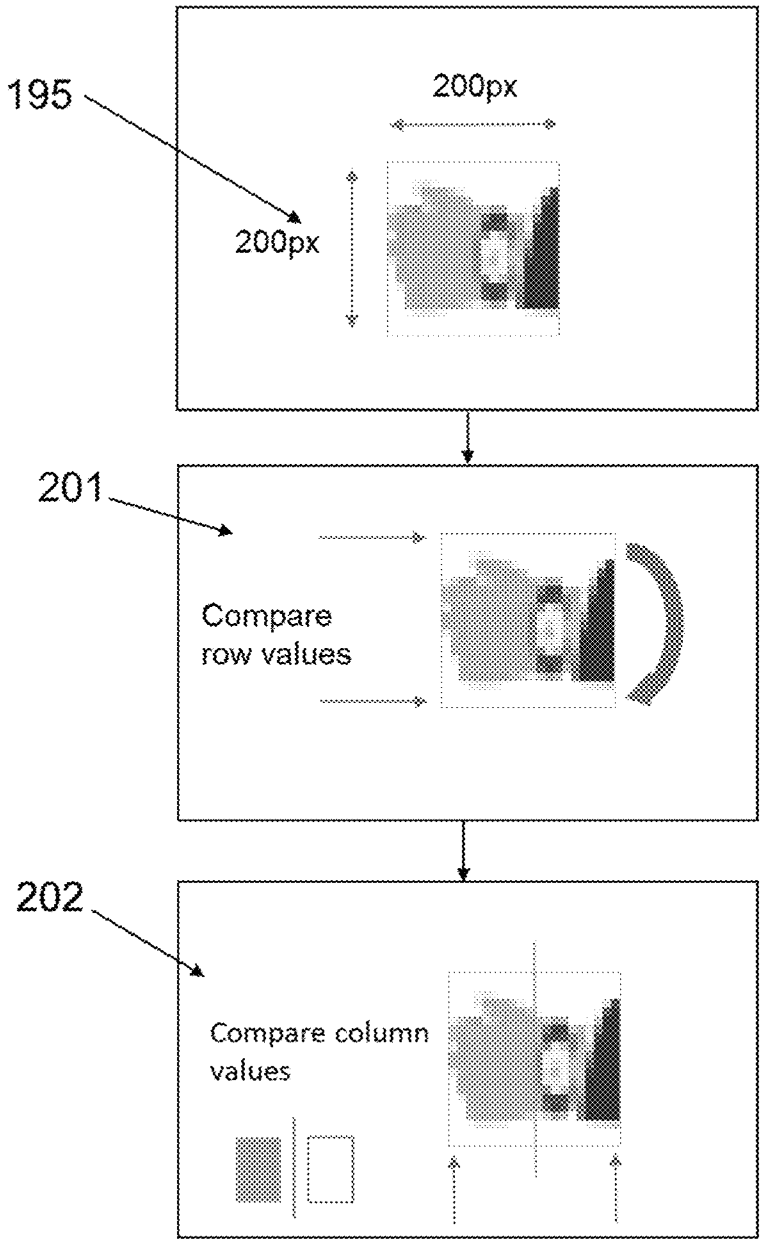

Pixelate the digital image to pixels size 10 x 10

Calculate first row (fx) pixel value
Calculate last row (lx) pixel value
Compare first row pixel value and
Last row value. If first row value is less than last row value, then rotate the digital image 180 degrees else do nothing.
If the two values are equal, then
proceed to fx + 1 and lx - 1

Calculate first column (fc) pixel value. Calculate last column (lc) pixel value. Compare first column value and last column value. If first column value is less than last column value, then flip the digital image over its own vertical centre axis. If the two values are equal, then proceed to fc + 1 and lc - 1

QUANTITATIVE IMAGE ANALYSIS

FIELD OF THE INVENTION

The invention relates to the field of image analysis and a method for quantitatively rating the degree of similarity between images. The invention also relates to a device instructed to perform the method, and a program and a computer-readable medium with instructions for carrying out the method.

BACKGROUND OF THE INVENTION

Digital documents such as files and images are widespread throughout society and industries. These digital documents may be classified in many ways regarding confidentiality and possible content of personal information making exchange and storage of such documents a cumbersome task. Furthermore, digital documents are relatively easy to manipulate to make different modified versions of the same digital document, e.g., an image may be resized, skewed or elements may be added or removed.

For some purposes where such digital documents and images are to be used, it may be sufficient and more expedient to convert the digital documents and images into a reduced data format. While this reduced data format will still serve many purposes going forward, even in the absence of the digital document or image itself, it can more easily comply with the requirements for data compliance in relation to confidentiality, General Data Protection Regulation (GDPR), Health Insurance Portability and Accountability Act (HIPAA) and the like.

Fraud is a global problem that affects not least the insurance industry. It is estimated that 10% of all insurance pay-outs are made to fraudsters. To receive an insurance pay-out, various documents must be presented to validate the insurance claim. Even then, there are loopholes. Fraudsters seek to cheat insurers in a plethora of ways and today, fraud has moved into the digital arena too.

Digital documents introduce a variety of new ways to cheat and commit fraud, not least insurance fraud. Verifying the uniqueness, ownership and authenticity of documents and items is very difficult when documents are digital files. In the past, digital rights management has been used on some file types to ensure that they were not copied, although the inconvenience thereof made it infeasible, and so insecure documents are here to stay. Verifying the uniqueness, ownership and authenticity of documents and items is the job of insurance investigators, who make value-judgments about documents throughout their workday. The more scrutinous they are, the slower and more expensive insurance pay-outs and premiums get. Some insurance companies have decided to solve this by being slack with verification and accepting as high as 20% fraud, since this allows them to have fewer investigators and so retain operative costs low.

Digital documents can often be copied indiscriminately. Keeping track of documents can be difficult and re-use of the same claim document for multiple cases across different insurance companies do happen. When a claim document is re-used in multiple insurance claim across different insurance companies, it is often due to insurance fraud. Fraudster either use their own or others images in multiple claims e.g. images downloaded from the internet.

To combat re-use of images in insurance fraud, some systems utilize a method where an image is converted to a HASH value and saved in a database. However, when a fraudster either mirrors, edits, rotates, resizes, crops or skews images, these traditional methods are no longer sufficient.

As fraudsters utilizes the same images across different insurance companies, there is a need for a database comprised of images from different insurers. This will help them combat fraud by getting an alert signal when an image is an image that has been handled (used in an insurance claim) in earlier claims. However; saving images directly to a database that can be accessed by different employees at insurance companies is not compliant to e.g. GDPR. To combat future fraud, a method is needed to save images into a database in a compliant manner, while still having the ability to correctly verifying if an image is used in other insurance claims, even when said image has been modified, e.g. cropped, skewed, rotated and/or mirrored.

There is a thus a need for increased security in the pay-out process as well as in verifying document authenticity at large. There is also a need for reducing the amount of data stored over time such as to limit data storage capacity expansions and minimize energy expenditure. Additionally, there is a need for being able to store reduced data format of digital images such that data is applicable for certain purposes while at the same time not requiring the cumbersome handling in compliance with confidentiality and data protection regulations.

SUMMARY OF THE INVENTION

In a first aspect, the present invention provides a method for quantitatively rating the degree of similarity between two digital images (100), comprising the following steps for each of the digital images (100):

- Check whether image width is less than image height, if image width is less than image height rotate image 90 degrees to obtain a horizontal orientated digital image (190),
- resize the horizontal orientated digital image (190) to a resized digital image (110) having a certain fixed size and number of pixels (130),
- pixelate the digital image to pixels of a fixed size to obtain a pixilated image (200) with an average color of each pixelated area (195),
- calculate total pixel values of the pixelated image (200) top row and calculate total pixel values of the pixelated image (200) bottom row
- compare the total pixel value of the top row with the total pixel value of the pixilated image bottom row, if the total pixel value of pixilated image the top row is less than the total pixel value of the pixilated image bottom row, then rotate the pixilated image (200) 180 degrees; If the total pixel value of the pixilated image top row is equal to total pixel value of the pixilated image bottom row, then proceed calculating the next row from top row and compare to next row from bottom row, if the total pixel value of the next row from top are equal to the total pixel value of the next row from bottom proceed with next rows until the centre row is reached (201),
- calculate total pixel values of the pixelated image (200) first column and calculate total pixel values of the pixelated image (200) last column and compare the total pixel values; if the total pixel value of the pixilated image first-column is less than the total pixel value of the pixilated image last column value, then flip the pixilated image (200) over its vertical axis; if the total pixel value of the pixilated image first-column value is equal to the total pixel value of the pixilated image last column value, then proceed calculating the total pixel value of the pixilated image next column from first column and compare to the total pixel value of the pixilated image next column from last column; if the total pixel value of the pixilated image next column from first column are equal to total pixel value of the pixilated image of the next column from last column proceed with next columns until centre column is reached (202), read a pixel from each of the pixelated area in the pixilated image (198) and calculate closest predefined color of each of the pixels red (203) to obtain a pixel RGB, convert each pixel RGB color to HEX value (204), add each pixel HEX value to an image string (170) representing the image pixel value, then calculate a hit-score (180) as a percentage identity or homology between the image strings (170) of the two digital images (100), said hit-score (180) being the rating of the similarity between the two digital images (100).

In a preferred embodiment the method further comprises the step of rotating the pixilated image (200) 180 degrees if the total pixel value of the pixilated image next row from top is less than the total pixel value of the pixilated image next row from bottom.

In a preferred embodiment the method further comprises the step of rotating the pixilated image (200) 180 degrees if the total pixel value of the pixilated image row V from top is less than the total pixel value of the pixilated image row V from bottom, where V is an integer larger than 1.

In a preferred embodiment the method further comprises the step of flipping the pixilated image over its vertical axis if the total pixel value of the pixilated image next column from first column is less than the total pixel value of the pixilated image next column from last column.

In a preferred embodiment the method further comprises the step of flipping the pixilated image over its vertical axis if the total pixel value of the pixilated image number Z column from first column is less than the total pixel value of the pixilated image of number Z column from last column, where Z is an integer larger than 1.

In a preferred embodiment the pixilated image is rotated in the above-mentioned procedure before it is flipped in the above-mentioned procedure.

In a second aspect, the present invention provides a method for quantitatively rating the degree of similarity between two digital images (100), comprising the following steps for each of the digital images (100):

resize the digital image (100) to a resized digital image (110) having a certain fixed size and number of pixels, divide the resized digital image (110) into a number of sections (120) having X rows and Y columns so that each section has the same number of pixels (130), divide each section (120) into a number of pixels (130) by rows and columns, so that each section has the same number of pixels (130), for each pixel (130), determine the color code value set (140), e.g. RGB, and assign a score being an integer or a letter for each of the primary colors (e.g. R, G and B), then assemble these scores into a pixel string (150), for each section (120) assemble all the pixel strings (150) into a section string (160) by appending the pixel strings (150) in a fixed order through all the pixels (130) in the section (120), and assemble all the section strings (160) into an image string (170) by appending the section strings (160) in a fixed order through all the sections (120) of said resized digital image (110), then calculate a hit-score (180) as a percentage identity or homology between the image strings (170) of the two digital images (100), said hit-score (180) being the rating of the similarity between the two digital images (100).

Using this method, identical images and minor modifications thereof can be matched. If a high hit-score (180) is being calculated, then there is a high likelihood that two different images are indeed a set of an original image and a modified version of that original image.

For example, a prior loss image (an image used in a previous insurance claim) may be provided in a different format or with different metadata in connection with fraudulent claims across different insurance companies. Also, such prior loss images may be provided with edits to part of the image, e.g., concealing certain blurred areas or cropping part out.

Hence, in one embodiment the modification of the image is a rotated image, a resized image, a skewed image, a cropped image, a mirrored image, an image with addition or elimination of one or more elements such as text or signs, or a combination thereof.

The present invention has several advantages, most notably that there is no need for storing previously handled images provided an image string (170) has been calculated by a known embodiment of the present method and stored. Since the image string (170) is a reduced data format that do not contain all the information from the image used for generating the image string (170), the confidentiality and data protection compliance challenges of storing images in a database (to e.g. see if an image has already been used in a previous insurance claim) are solved by the present invention.

Storing only the reduced data format in the form of the image string (170) takes up only little space in a database and thus limits the speed of data storage capacity upgrade over time and it is energy-saving.

Furthermore, by comparing a digital image through the use of image strings (170) with a list of historically used/generated image strings (170), a portion of insurance fraud attempts can be stopped in their tracks, freeing up insurance investigators to investigate other cases, such as more complicated cases. Yet further, the investigators need to perform fewer mouse-clicks on average to process an insurance claim.

In a third aspect the present invention provides a method for determining whether an image (100) has already been handled as the same image (100) or a modification thereof, comprising the determination of an image string (170) by the method provided in the first aspect of the invention and calculating the hit-score as a percentage identity or homology between the image string (170) of said image and the image strings (170) in a database (205) comprising the image strings of previously handled images for which image strings (170) have been calculated and stored in the database (205).

An important advantage of the methods of both the first and second aspect of the present invention is that they do not require access to the previously handled images for which image strings (170) are stored in a database (205).

In a fourth aspect the present invention provides the use of the methods for the verification of the uniqueness of an image, such as from a digital image (100).

In a fifth aspect the present invention provides the use of the methods in the process of handling insurance claims for increased security in the pay-out process.

In a sixth aspect the present invention provides a computing device (210) having a processor (211) adapted to perform the steps of the methods.

In a further aspect the present invention provides a computer program comprising instructions which cause the computer (210) to carry out one of the methods, when the program is executed by a computer (210).

In a yet further aspect, the present invention provides computer-readable medium comprising instructions which cause the computer (210) to carry out one of the methods, when executed by a computer (210).

BRIEF DESCRIPTION OF THE DRAWINGS

FIG. 1. Comparison of the original image (A) with different types of modifications of the original image being a rotated image (B), a resized image (C), a skewed image (D), a cropped image (E) and a mirrored image (F).

DETAILED DESCRIPTION OF THE INVENTION

Figure 2:
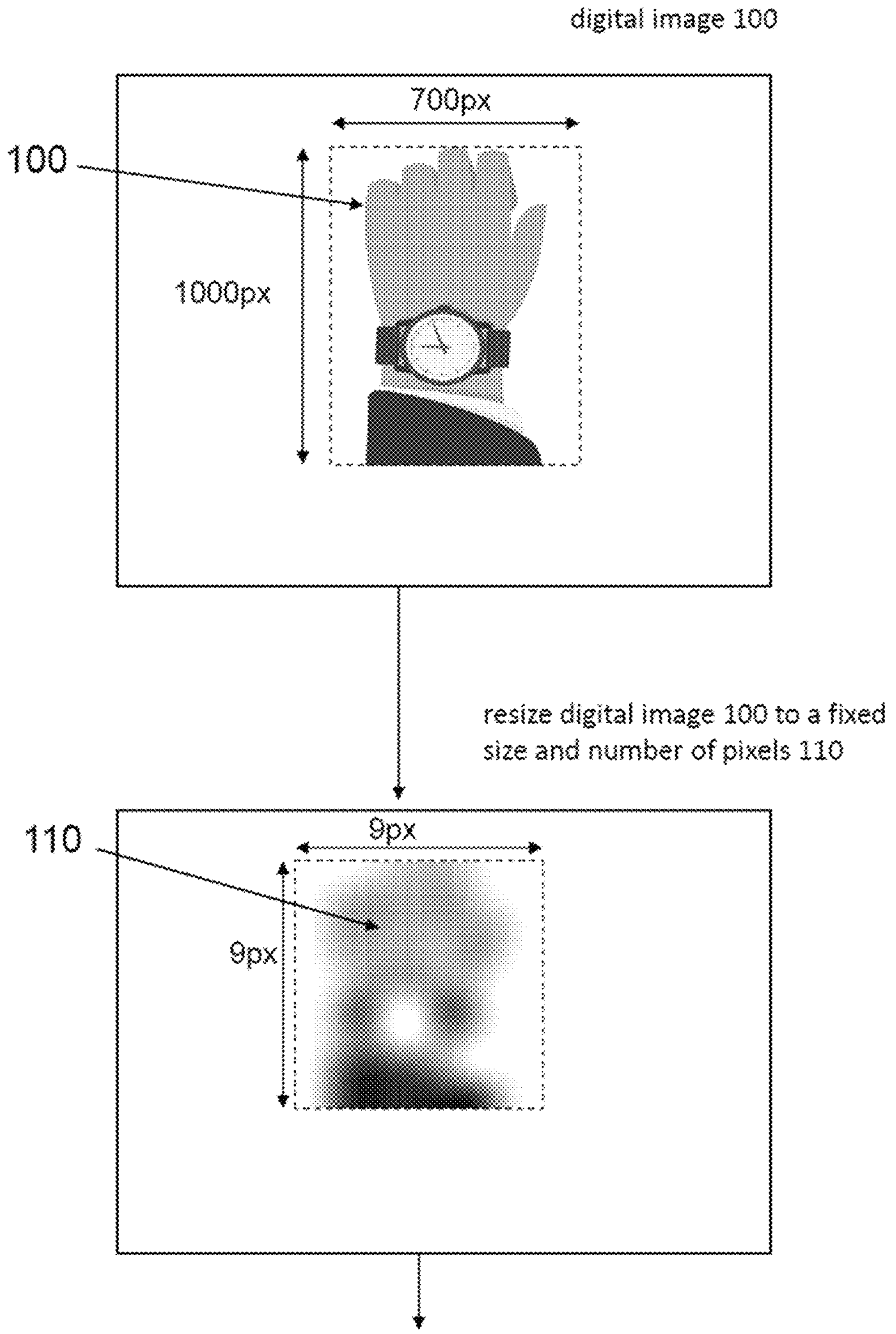
FIG. 2. Example embodiment with an original digital image (100) having 700×1000 pixels resolution being resized to a resized digital image (110) having a fixed size and number of pixels being 9×9 resolution.

In the following the invention is described in detail through exemplary embodiments which should not be considered as limiting to the scope of the invention.

Throughout the present text and figures it is noted that number identifiers are used to designate both the singular and the plural form of an item or concept. For instance, the identifier "100" is used both in singular for "digital image (100)" and in plural for "digital images (100)".

FIG. 1 illustrates some types of modifications to an original image which may typically be encountered when images are re-used in multiple insurance companies to conduct insurance fraud, in order to conceal that it's an image that the fraudster have already used.

In one embodiment the modification of the image is a rotated image, a resized image, a skewed image, a cropped image, a mirrored image, an image with addition or elimination of one or more elements such as text or signs, an image with a part being blurred, or a combination thereof.

In an aspect the present invention provides a method for quantitatively rating the degree of similarity between two digital images (100), comprising the following steps for each of the digital images (100):

- resize the digital image (100) to a digital image having a certain fixed size and number of pixels (110),
- divide the resized digital image (110) into a number of sections (120) having X rows and Y columns so that each section has the same number of pixels (130),
- divide each section (120) into a number of pixels (130) by rows and columns, so that each section has the same number of pixels (130),
- for each pixel (130), determine the color code value set (140), e.g. RGB, and assign a score being an integer or a letter for each of the primary colors (e.g. R, G and B), then assemble these scores into a pixel string (150),
- for each section (120) assemble all the pixel strings (150) into a section string (160) by appending the pixel strings (150) in a fixed order through all the pixels (130) in the section (120), and
- assemble all the section strings (160) into an image string (170) by appending the section strings (160) in a fixed order through all the sections (120) of said resized digital image (110), then calculate a hit-score (180) as a percentage identity or homology between the image strings (170) of the two digital images (100), said hit-score (180) being the rating of the similarity between the two digital images (100).

In the practical use of the method of the invention the image string (170) of a particular digital image (100) can be calculated by the method of the invention and then compared by calculation of percentage identity or homology to a plurality of image strings (170) in a database where said plurality of image strings (170) are often generated previously by using the same method with the same parameters for resizing the digital image (100), dividing into sections (120) and pixels (130), generation of pixel strings (150) and section strings (160) ending up with the image string (170).

In this practical application of the method of the invention, the requestor of the quantitative image uniqueness analysis who submits the digital image will receive the highest hit-score (180) or a group of the highest hit-scores (180) calculated by comparing the image string (170) with a plurality of previously generated image strings (170) in a database.

In one exemplary embodiment the assignment of a score for the color code value set (140) being RGB (46, 117, 182) is as follows: For each of R(46), G(117) and B(182) an integer between 1-5 is assigned via the following system:

If R(0)=1
If R(1-85)=2
If R(86-170)=3
If R(171-254)=4
If R(255)=5.

The same assignment for G and B. In this embodiment the pixel (130) having the color code value set RGB (46, 117, 182) will generate the pixel string (150) being "234".

Hence, in a section (120) having 3 rows and 3 columns there will be 9 pixels (130) and thus 9 pixel strings (150).

When these 9 pixel strings (150) are assembled it will give a section string (160) which has a length of 27 integers, e.g.: "222 232 444 222 234 222 222 431 334".

If the resized image (110) was divided by 4 rows and 4 columns into 16 sections (120), then the image string (170) has 16×27=432 integers.

Figure 3:
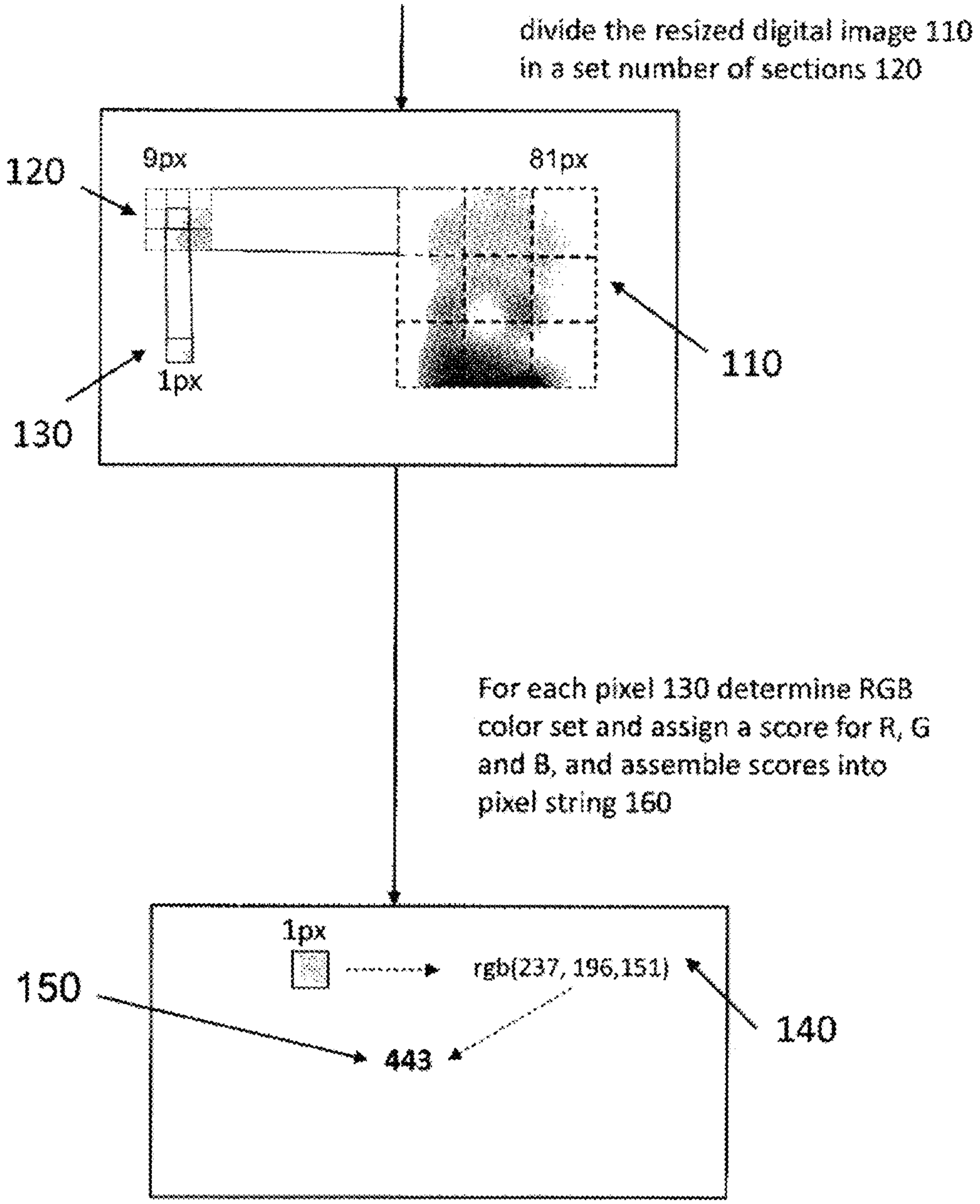
FIG. 3. The example embodiment from FIG. 2 where the resized image (110) is divided into sections (120) of 9 pixels (3×3) to select a single pixel (130) for determination of the color code value set (140) being scored by assigning an integer from 1-5 and assembling the tree scores to the pixel string (150).

In another exemplary embodiment FIG. 2 shows an original digital image (100) having 700×1000 pixels resolution being resized to a fixed size and number of pixels (110) being 9×9 resolution. In FIG. 3 the resized image (110) is divided into sections (120) using X=3 rows and Y=3 columns. Each section (120) has 3×3=9 pixels (130) and for each pixel (130) is determined the color code value set (140) according to the RGB system, giving the set: RGB (237, 196, 151). The pixel string (150) assigned for this RGB set using the above assignment system having integers from 1-5 will generate the pixel string (150): "443". With 9 pixels (130) in each section (120) the section string (160) will consist of 9×3=27 integers. As we have 9 sections (120), the image string (170) will consist of 9×27=243 integers.

It is well known to the person skilled in the art how to calculate a hit-score (180) as a percentage identity or homology between the image strings (170) of the two digital images (100). Since the two image strings (170) used for calculating the percentage identity or homology are always the same length, the algorithm for calculating percentage identity is very simple: align the two image strings (170) and count how many position have identical integer or letter, and divide that number by the length of the image string (170) times 100 (unit: %). Also, when calculating percentage homology the image strings (170) have the same length, hence for homology there will only be the added rule for how big a discrepancy qualifies for homology. The calculation is then to sum the homologous and identical positions of the image strings (170), divide by the length of the image string (170) times 100 (unit: %).

It is given that the division of the resized images (110) is by X rows and Y columns into the sections (120), then the sections (120) are either squares or rectangles. Choosing between squares and rectangles here is based on the size and format of the digital image, since the better match will give the best method/algorithm for the purpose.

In one embodiment, both X and Y are 3 or 4. In another embodiment (X, Y) is selected from (3,4), (4,3), (3,5) and (5,3).

Also, the division of the sections (120) into pixels (130) by rows and columns results in squares or rectangles of the pixels (130) in one given section (120). In one embodiment the number of pixels (130) in each section is in the range from 6 to 70, in the range from 8 to 49, in the range from 9 to 25, or in the range from 9 to 16.

In another embodiment the number of pixels (130) in each section is 8, 9, 12, 15, 16 or 20.

In another exemplary embodiment the assignment of a score for the color code value set (140) being RGB (46, 117, 182) is as follows: For each of R(46), G(117) and B(182) an integer between 1-6 is assigned via the following system:

If R(0-9)=1
If R(10-40)=2
If R(41-99)=3
If R(100-170)=4
If R(171-245)=5
If R(246-255)=6.

The same assignment for G and B. In this exemplary embodiment the pixel (130) having the color code value set RGB (46, 117, 182) will generate the pixel string (150) being "345".

In another aspect the present invention provides a method for quantitatively rating the degree of similarity between two digital images (100), comprising the following steps for each of the digital images (100):

- Check whether image width is less than image height, if image width is less than image height rotate image 90 degrees to obtain a horizontal orientated digital image (190),
- resize the horizontal orientated digital image (190) to a resized digital image (110) having a certain fixed size and number of pixels (130),
- pixelate the digital image to pixels of a fixed size to obtain a pixilated image (200) with an average color of each pixelated area (195),
- calculate total pixel values of the pixelated image (200) top row and calculate total pixel values of the pixelated image (200) bottom row
- compare the total pixel value of the top row with the total pixel value of the pixilated image bottom row, if the total pixel value of pixilated image the top row is less than the total pixel value of the pixilated image bottom row, then rotate the pixilated image (200) 180 degrees; If the total pixel value of the pixilated image top row is equal to total pixel value of the pixilated image bottom row, then proceed calculating the next row from top row and compare to next row from bottom row, if the total pixel value of the next row from top are equal to the total pixel value of the next row from bottom proceed with next rows until the centre row is reached (201),
- calculate total pixel values of the pixelated image (200) first column and calculate total pixel values of the pixelated image (200) last column and compare the total pixel values; if the total pixel value of the pixilated image first-column is less than the total pixel value of the pixilated image last column value, then flip the pixilated image (200) over its vertical axis; if the total pixel value of the pixilated image first-column value is equal to the total pixel value of the pixilated image last column value, then proceed calculating the total pixel value of the pixilated image next column from first column and compare to the total pixel value of the pixilated image next column from last column; if the total pixel value of the pixilated image next column from first column are equal to total pixel value of the pixilated image of the next column from last column proceed with next columns until centre column is reached (202),
- read a pixel from each of the pixelated area in the pixilated image (198) and calculate closest predefined color of each of the pixels red (203) to obtain a pixel RGB,
- convert each pixel RGB color to HEX value (204),
- add each pixel HEX value to an image string (170) representing the image pixel value,
- then calculate a hit-score (180) as a percentage identity or homology between the image strings (170) of the two digital images (100), said hit-score (180) being the rating of the similarity between the two digital images (100).

In the practical use of the method of the invention the image string (170) of a particular digital image (100) is calculated by the method of the invention and then compared by calculation of percentage identity or homology to a plurality of image strings (170) in a database where said plurality of image strings (170) are often generated previously by using the same method with the same parameters for resizing the digital image (100), dividing into pixels (130), generation of pixel strings (202) ending up with the image string (170).

In this practical application of the method of the invention, the requestor of the quantitative image uniqueness analysis who submits the digital image will receive the highest hit-score (180) or a group of the highest hit-scores (180) calculated by comparing the image string (170) with a plurality of previously generated image strings (170) in a database.

In one exemplary embodiment the assignment of a score for the color code value set being RGB (230,172,109) is as follows. Calculate distance to closest predefined 140 colors—sample listed below:

PowderBlue;176,224,230
Purple;128,0,128
Red;255,0,0
RosyBrown;188,143,143
RoyalBlue;65,105,225
SaddleBrown;139,69,19
Salmon;250,128,114
SandyBrown;244,164,96
SeaGreen;46,139,87
SeaShell;255,245,238
Sienna;160,82,45
Silver;192,192,192
SkyBlue;135,206,235
SlateBlue;106,90,205
SlateGray;112,128,144

The calculated closest color is RGB (244,164,96). The RGB pixel value is transformed from decimal to hexadecimal notation to provide conform data representation. Thus (244,164,96) is F4A460 which is the pixel string.

Pixels strings representing each pixel in the digital images is assembled into a single sting representing the digital image (170).

. . . 4A460F4A460DEB887FFF
5EEFFFFFFFFFAFAFFFAFAFFFAFAFFFAFAFF
FAFAF5F5F5556B2F2F4F4FFAEBD7F5DEB3DE
B887E9967AF5DEB3DEB887F
4A460F4A460F4A460F4A460DEB887D3D3D3
A9A9A9COCOCOFFFFFFFFFFFF
8F8FFC0C0C02F4F4F2F4F4FDEB887F4A460F4
A460F4A460F4A460F4A460F4
A460F4A460F4A460F4A46 . . . .

As will be evident from the above two exemplary embodiments using a different system for assignment of the score for the color code value set (160) being RGB (46, 117, 182), the method of the invention works for the comparison of two or more image strings (170) provided all of these image strings (170) are generated by the same method, i.e. same parameter for resizing the digital image (100), dividing into pixels (202), generation of pixel strings (203) ending up with the image string (170).

The color code value set 140 may be determined based on different color systems. In one embodiment the color code value set 140 is based on the RGB (red, green, blue) system giving a three digit/letter pixel string (150). The RGB system is widely used and commercial scanners can provide this format. Another color system is the CMYK (cyan, magenta, yellow and black) system giving a four digit/letter pixel string 150.

The score assigned to each pixel using the color code value set (140) can be any system which combines simplicity and discriminatory ability. In an embodiment, said score is an integer or a letter which is selected from an integer, a single digit integer, an integer in the range from 1 to 7, an integer in the range from 1 to 5 and an integer in the range from 1 to 3. In another embodiment, said score is an integer or a letter which is selected from a letter, a letter from a group of three letters, a letter from a group of five letters or a letter from a group of seven letters, such as (a, b, c) or (f, g, h, i, j).

In an embodiment, said fixed order for assembling the strings is row by row starting from the top row moving down or starting from the bottom row moving up.

In an embodiment, said fixed order for assembling the strings is column by column starting from the left hand column moving right or starting from the right hand column moving left.

In a further aspect the present invention provides the use of the method for the verification of the uniqueness of an image, such as from a digital image (100).

Such a use of the method of the invention for verification of the uniqueness of an image is advantageous in a number of industries, in particular in connection with the prevention of fraud, such as insurance fraud or fraud with product guarantees. In the latter situation a manufacturer of e.g. expensive engine parts may be faced with guarantee claims over broken engine part, in which case it is advantageous to ensure that an image of the broken engine part is unique, i.e. it has not already been submitted via another engines part retailer.

In a further aspect the present invention provides the use of the method in the process of handling insurance claims for increased security in the pay-out process.

As set out above, it is an great advantage that the method converts the digital image to an image string (170), since the actual image of the latter is not available and hence the image strings (170) can be stored in a database (200) without the set-up required for handling confidential documents and personal information under e.g. GDRP or HIPAA.

In a further aspect the present invention provides a computing device (210) having a processor (211) adapted to perform the steps of the present method.

In a yet further aspect the present invention provides a computer program comprising instructions which cause the computer (210) to carry out the method, when the program is executed by a computer (210).

In a yet further aspect the present invention provides a computer-readable medium comprising instructions which cause the computer (210) to carry out the method, when executed by a computer (210).

Figure 5:
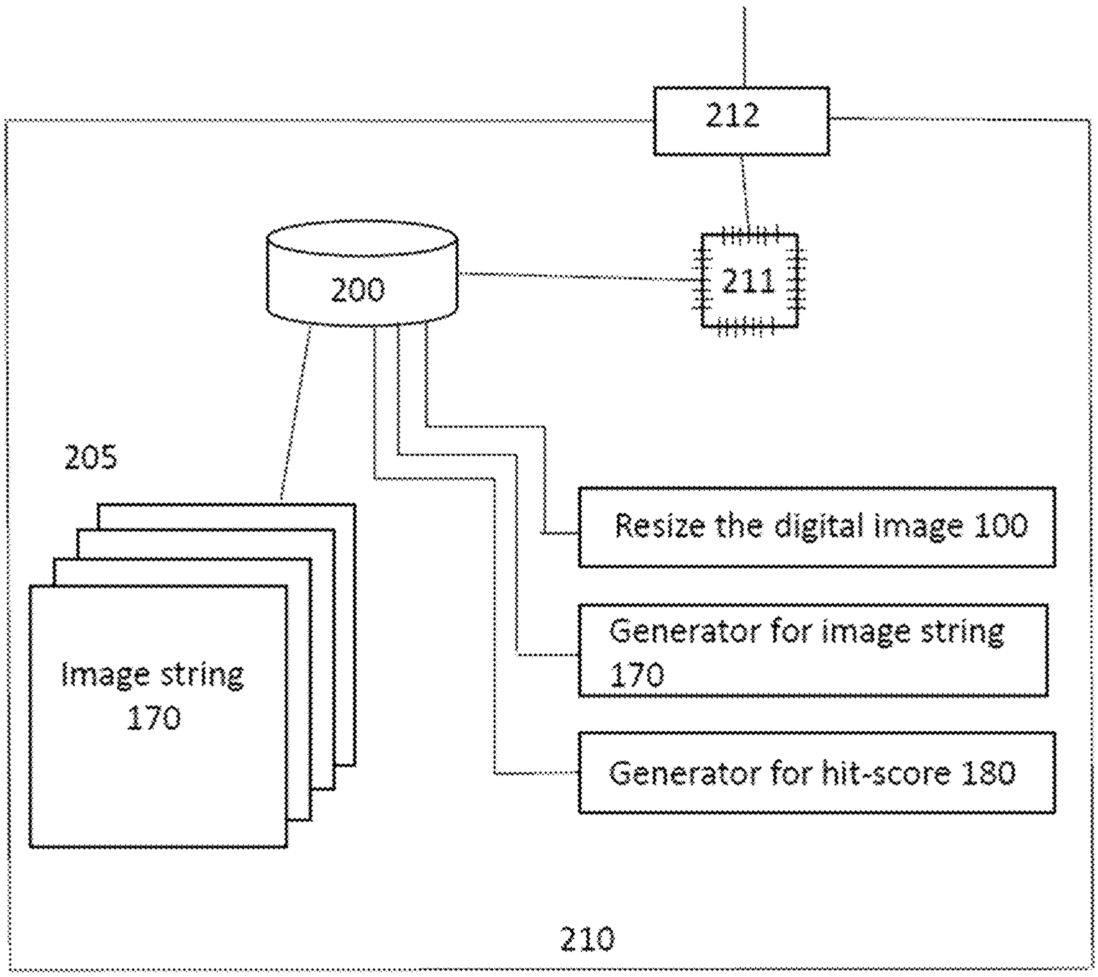
Figure 6:
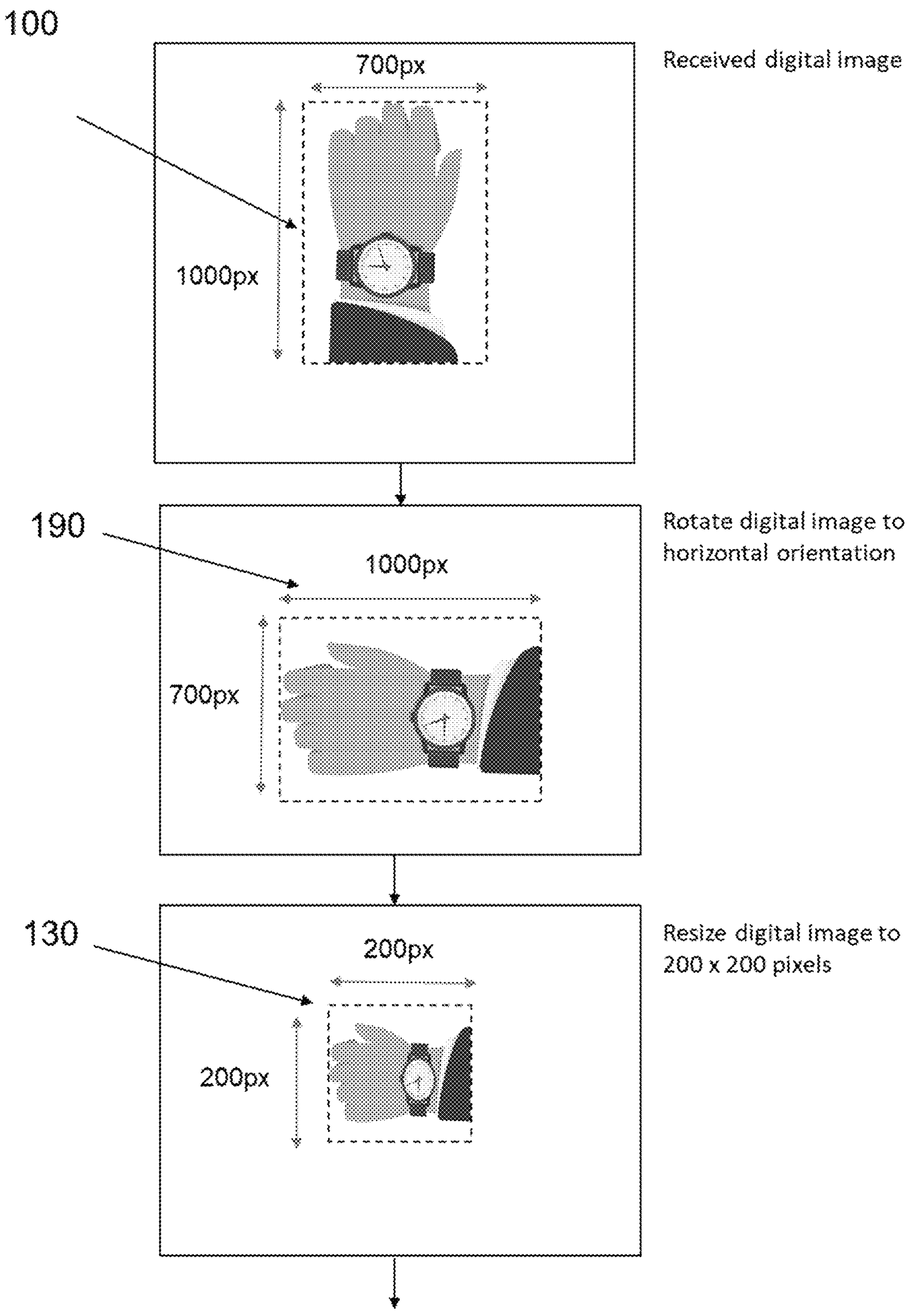
Figure 8:
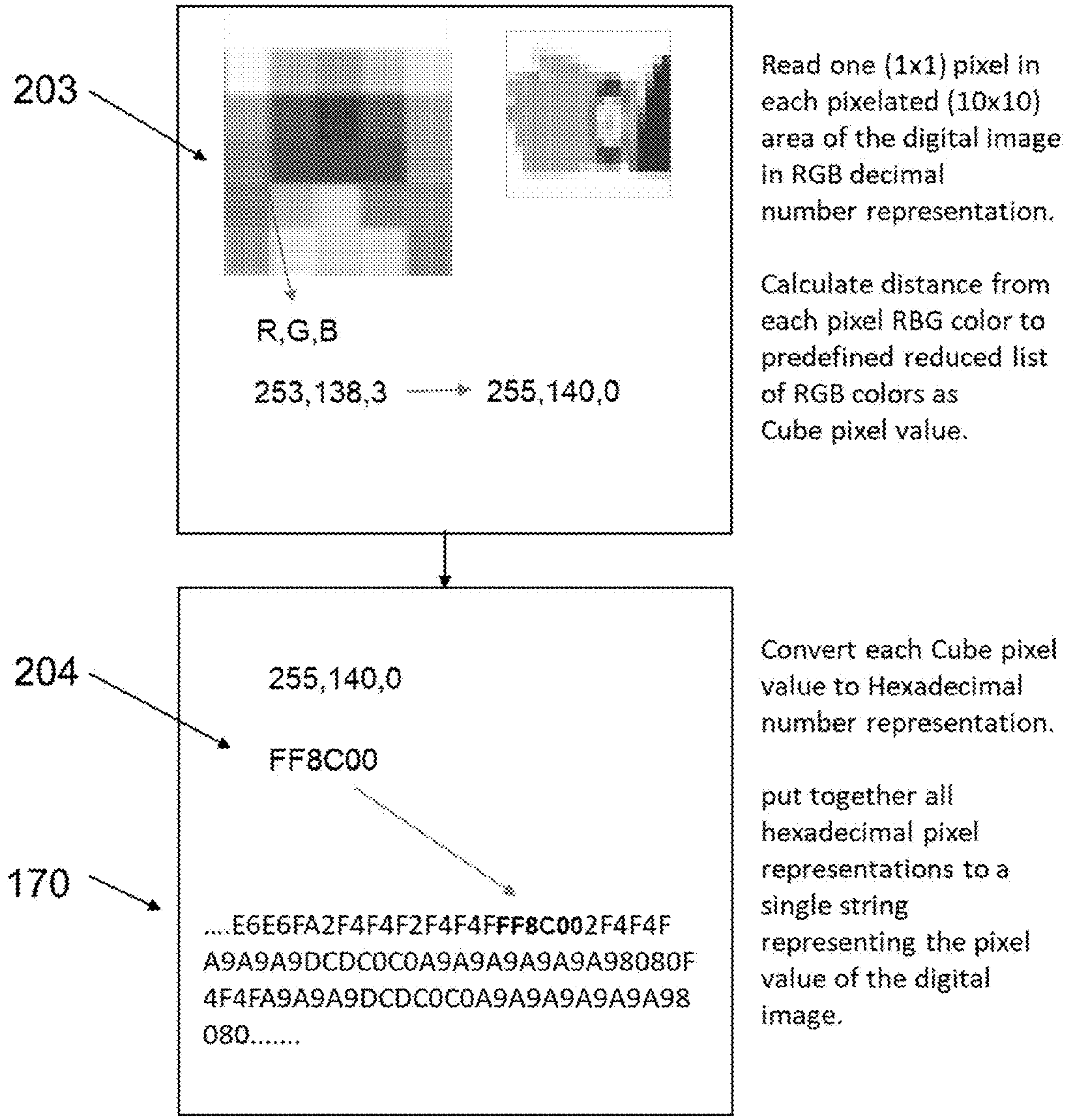
FIG. 8. The example embodiment from FIG. 7 where the resized image and pixelated image (110) is red one pixel from each of the pixelated areas (10×10 pixels) and closest color from predefined list of colors is identified and converted from decimal representation of the RGB color to hexadecimal representation and assembling the hexadecimal pixel values to the pixel string.

FIG. 5 illustrates the computer (210) instructed for performing the method for quantitatively rating the degree of similarity between two digital images (100), the system comprising a computer (210) having a processor (211), a networking interface (212) and a storage device (200) having a database of image strings (205) generated by the present method.

Figure 4:
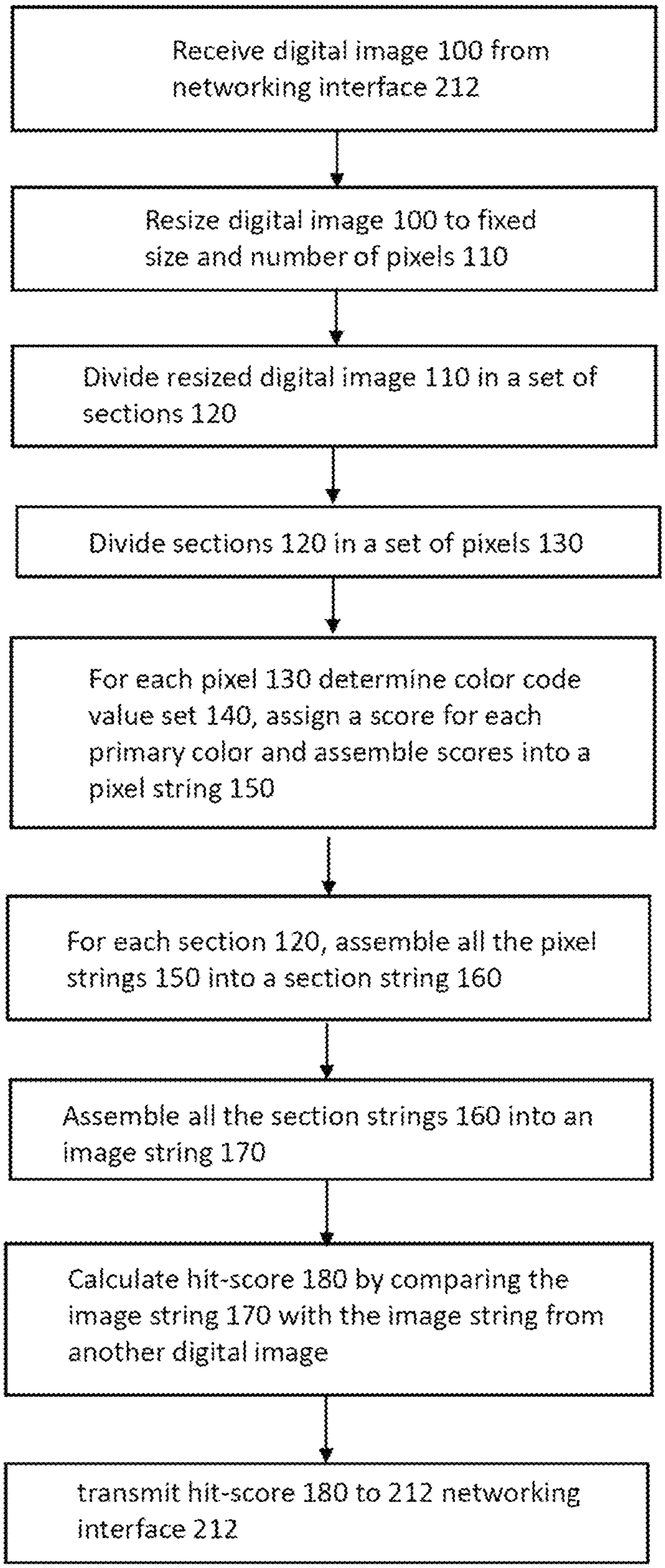
FIG. 4. Graphical illustration of the steps of the method of an embodiment of the invention FIG. 5 Illustration of a computing device according to an embodiment of the invention FIG. 6. Example embodiment with an original digital image (100) having 700×1000 pixels resolution being rotated to horizontal view and resized to a fixed size and number of pixels (110) being 200×200 pixels FIG. 7. The example embodiment from FIG. 6 where the resized image (110) is divided into sections (120) of 400 pixels (10×10) by pixelation and rotated to bring the brightest area of the digital image in top and flipped over its vertical centre axis to bring the brightest area of the digital image to the right.

The networking interface (212) receives requests for digital image (100) uniqueness verification from various devices, such as over an organizations intranet, an insurance claim handling system, or a public internet. The networking interface (212) transmits the signal to the processor (211) for computations according to the steps of the method, see e.g. FIG. 4 for illustration of the steps.

The processor (211) performs the division of the resized image (110) into sections (120), and division of the sections (120) into pixels (130), followed by the assignment of a score for each of the individual color codes and assembling them into a pixel string (150). For all the sections (120), the processor (211) then generates a section string (160) by assembling all the pixel strings (150) from a section (120) and then generates the image string (170) by assembling all of the section strings (160). The processor (211) finally calculates a hit-score (180) as a percentage identity or homology between the image strings (170) of two digital images (100), said hit-score (180) being the rating of the similarity between the two digital images (100). This hit-score (180) is returned via the networking interface (212) to the device making the request for uniqueness verification (e.g., an insurance investigator). As described above the practical use of the method of the invention will often imply that an image string (170) is compared by the calculation using another, previously generated, image string (170) or plurality of image strings (170) from a database.

Figure 9:
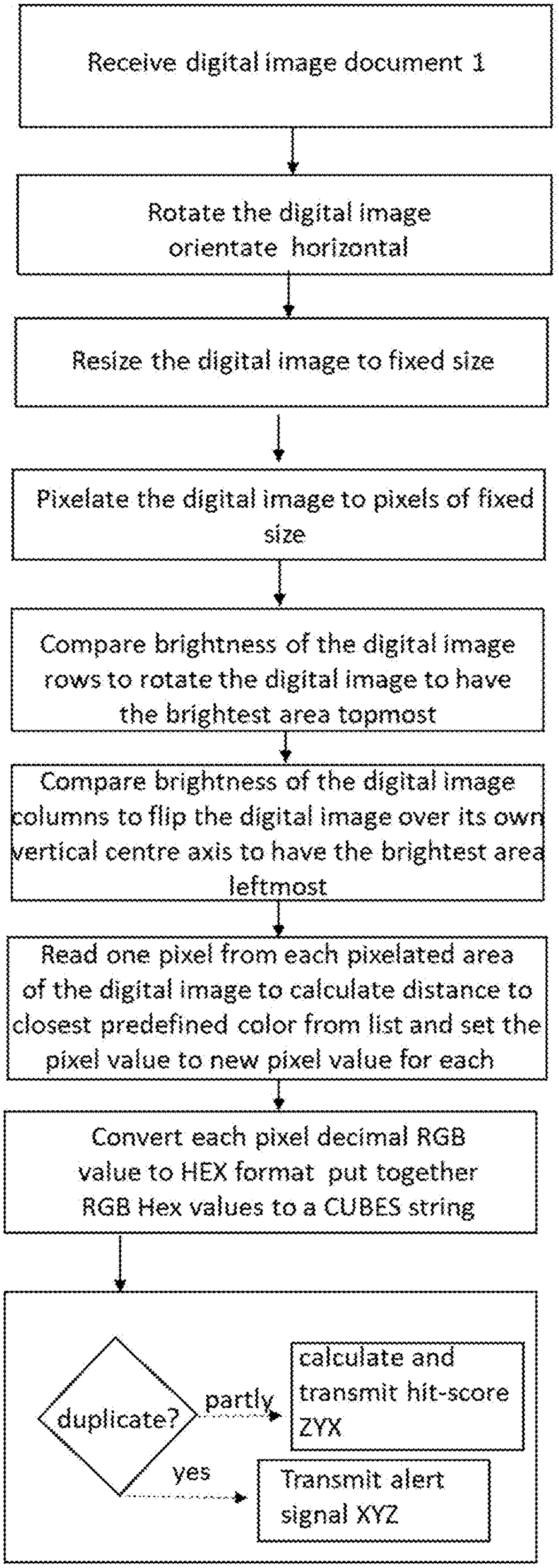
FIG. 9. Graphical illustration of the steps of the method of an embodiment of the invention.

Alternatively as illustrated in FIG. 9, the processor (211) performs the rotating of the digital image to obtain a horizontal image (190) and the resizing of the mage to a resized image (110), rotation and flipping vertically, into pixelation (195), into pixels (130), followed by the transform from decimal representation to hexadecimal representation them into a image string (170). For all the pixels, the processor (211) then generates an image string (170) by assembling all the pixel strings. The processor (211) finally calculates a hit-score (180) as a percentage identity or homology between the image strings (170) of two digital images (100), said hit-score (180) being the rating of the similarity between the two digital images (100). This hit-score (180) is returned via the networking interface (212) to the device making the request for uniqueness verification (e.g., an insurance investigator). As described above the practical use of the method of the invention will often imply the an image string (170) is compared by the calculation using another, previously generated, image string (170) or plurality of image strings (170) from a database.

The hit-score (180) is a percentage number in the range from 0% indicating no similarity to 100% indicating exact match under parameters used in the method. The requestor for comparing digital images will determine one or more threshold levels for alerts on initiating closer analysis and scrutiny in relation to digital image not being unique. For instance, above the threshold of 95% an alert is issued to the requestor while for a threshold between 85% and 95% an observance notice is issued to the requestor.

The invention claimed is:

1. A method for quantitatively rating the degree of similarity between two digital images, comprising the following steps for each of the digital images:

check whether image width is less than image height, if image width is less than image height rotate image 90 degrees to obtain a horizontally orientated digital image, resize the horizontally orientated digital image to a resized digital image having a certain fixed size and number of pixels, pixelate the resized digital image to pixels of a fixed size to obtain a pixilated image with an average color of each pixelated area, calculate a total pixel value of the pixelated image top row and calculate a total pixel value of the pixelated image bottom row, compare the total pixel value of the top row with the total pixel value of the pixilated image bottom row, if the total pixel value of the pixilated image the top row is less than the total pixel value of the pixilated image bottom row, then rotate the pixilated image 180 degrees;

if the total pixel value of the pixilated image top row is equal to the total pixel value of the pixilated image bottom row, then proceed with calculating the total pixel value of the next row from the top row and the total pixel value of the next row from the bottom row, and compare the total pixel value of the next row from the top row to the total pixel value of the next row from the bottom row, if the total pixel value of the next row from the top row is equal to the total pixel value of the next row from the bottom row, proceed with the next rows until a centre row is reached, calculate a total pixel value of the pixelated image first column and calculate a total pixel value of the pixelated image last column and compare the total pixel values;

if the total pixel value of the pixilated image first column is less than the total pixel value of the pixilated image last column, then flip the pixilated image over its vertical axis;

if the total pixel value of the pixilated image first column is equal to the total pixel value of the pixilated image last column, then proceed calculating the total pixel value of the pixilated image next column from the first column and compare to the total pixel value of the pixilated image next column from the last column;

if the total pixel value of the pixilated image next column from the first column is equal to total pixel value of the pixilated image of the next column from the last column, proceed with next columns until a centre column is reached, read a pixel from each pixelated area in the pixilated image and calculate a closest predefined color of each of the pixels read to obtain a pixel RGB color, convert each pixel RGB color to a HEX value, add each pixel HEX value to an image string representing the image pixel value, and then calculate a hit-score as a percentage identity or homology between the image strings of the two digital images, said hit-score being the rating of the similarity between the two digital images.

2. A method according to claim 1 further comprising the step of rotating the pixilated image 180 degrees if the total pixel value of the pixilated image row V from top is less than the total pixel value of the pixilated image row V from bottom, where V is an integer larger than 1.

3. A method according to claim 1 further comprising the step of flipping the pixilated image over its vertical axis if the total pixel value of the pixilated image number Z column from first column is less than the total pixel value of the pixilated image of number Z column from last column, where Z is an integer larger than 1.

4. The method according to claim 1, wherein the color code value set is RGB (red, green, blue) giving a three digit/letter pixel string or CMYK (cyan, magenta, yellow and black) giving a four digit/letter pixel string.

5. The method according to claim 1, wherein said score being an integer or a letter is selected from an integer, a single digit integer, an integer in the range from 1 to 7, an integer in the range from 1 to 5 and an integer in the range from 1 to 3.

6. The method according to claim 1, wherein said score being an integer or a letter is selected from a letter, a letter from a group of three letters, a letter from a group of five letters or a letter from a group of seven letters, such as (a, b, c) or (f, g, h, i, j).

7. A method for determining whether a digital image has already been handled as the same digital image or a modification thereof, comprising the determination of an image string by the method defined in claim 1 and calculating the hit-score as a percentage identity or homology between the image string of said image and the image strings in a database comprising the image strings of previously handled images, for which image strings have been calculated and stored in the database.

8. The method of claim 7, which does not require access to the previously handled digital images for which image strings are stored in a database.

9. The method according to claim 7, wherein said modification of the image is a rotated image, a resized image, a skewed image, a cropped image, a mirrored image, and an image with addition or elimination of one or more elements comprising one or both of text and signs.

10. Use of the method as defined in claim 1 for the verification of the uniqueness of a digital image.

11. Use of the method as defined in claim 1 in the process of handling insurance claims for increased security in the pay-out process.

12. A computing device having a processor adapted to perform the steps of a method as defined in claim 1.

13. A computer comprising a storage device that is operable to store instructions and a processor that is operable to execute the instructions which cause the computer to carry out the method as defined in claim 1, when the instructions are executed by the processor.

14. A storage device that is operable to store instructions which cause a computer to carry out the method as defined in claim 1, when executed by the computer.

* * * * *